J. E. STANNARD.
SPRING WHEEL.
APPLICATION FILED OCT. 20, 1909.

1,003,158.

Patented Sept. 12, 1911.

2 SHEETS—SHEET 1.

WITNESSES:
A. C. Fairbanks
J. M. Davenport

INVENTOR.
John E. Stannard,
BY Webster & Co.,
ATTORNEYS.

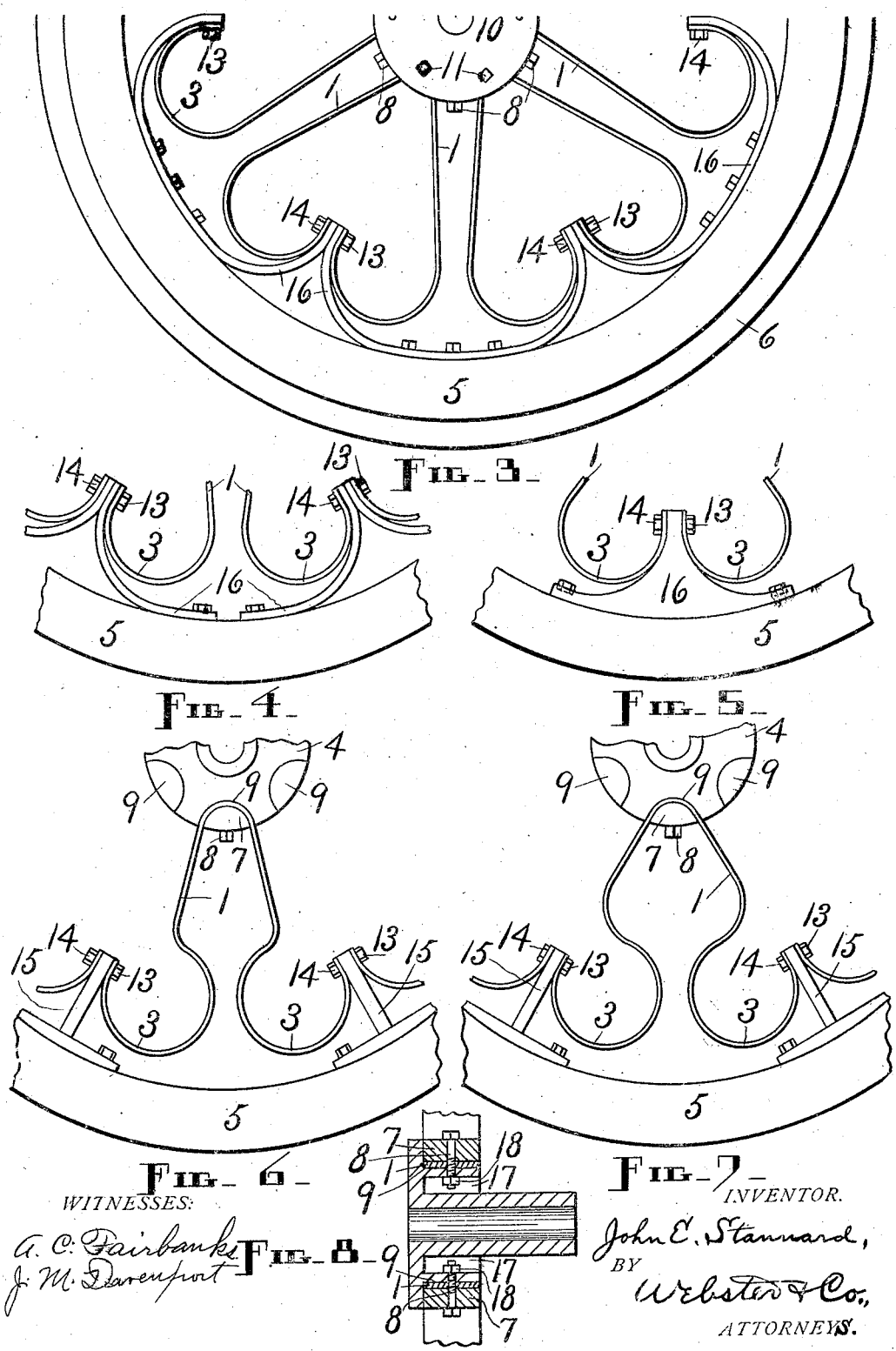

UNITED STATES PATENT OFFICE.

JOHN E. STANNARD, OF SPRINGFIELD, MASSACHUSETTS, ASSIGNOR TO HIMSELF, FRANCIS J. MILLEA, AND GEORGE W. D. UPTON.

SPRING-WHEEL.

1,003,158.  Specification of Letters Patent.  Patented Sept. 12, 1911.

Application filed October 20, 1909. Serial No. 523,659.

*To all whom it may concern:*

Be it known that I, JOHN E. STANNARD, a citizen of the United States of America, residing at Springfield, in the county of Hampden and State of Massachusetts, have invented a new and useful Spring-Wheel, of which the following is a specification.

My invention relates to improvements in vehicle wheels designed to dispense with the use of pneumatic tires, and more particularly to improvements in the wheel covered by United States Letters Patent, No. 901,751, of October 20, 1908, and said invention consists in a general way of certain peculiar springs and means for attaching, fastening or securing said springs to the hub of a wheel and to the rim of said wheel, such springs being the substitutes for ordinary spokes, all as hereinafter set forth.

The objects of my invention are, first, to produce a wheel which is so inherently yielding and elastic or resilient that no pneumatic tire is needed to give to such wheel the cushioning and other effects desired; second, to provide a wheel of this kind that is strong and durable and at the same time comparatively light and simple in construction, can be easily assembled and taken apart and reassembled for repairs, and is withal entirely satisfactory and efficient for the purpose for which it is intended, and, third, to afford means of great practicability, in a spring wheel, for securely attaching or fastening springs in position in the wheel. I attain these objects by the means illustrated in the accompanying drawings, in which—

Figure 1:
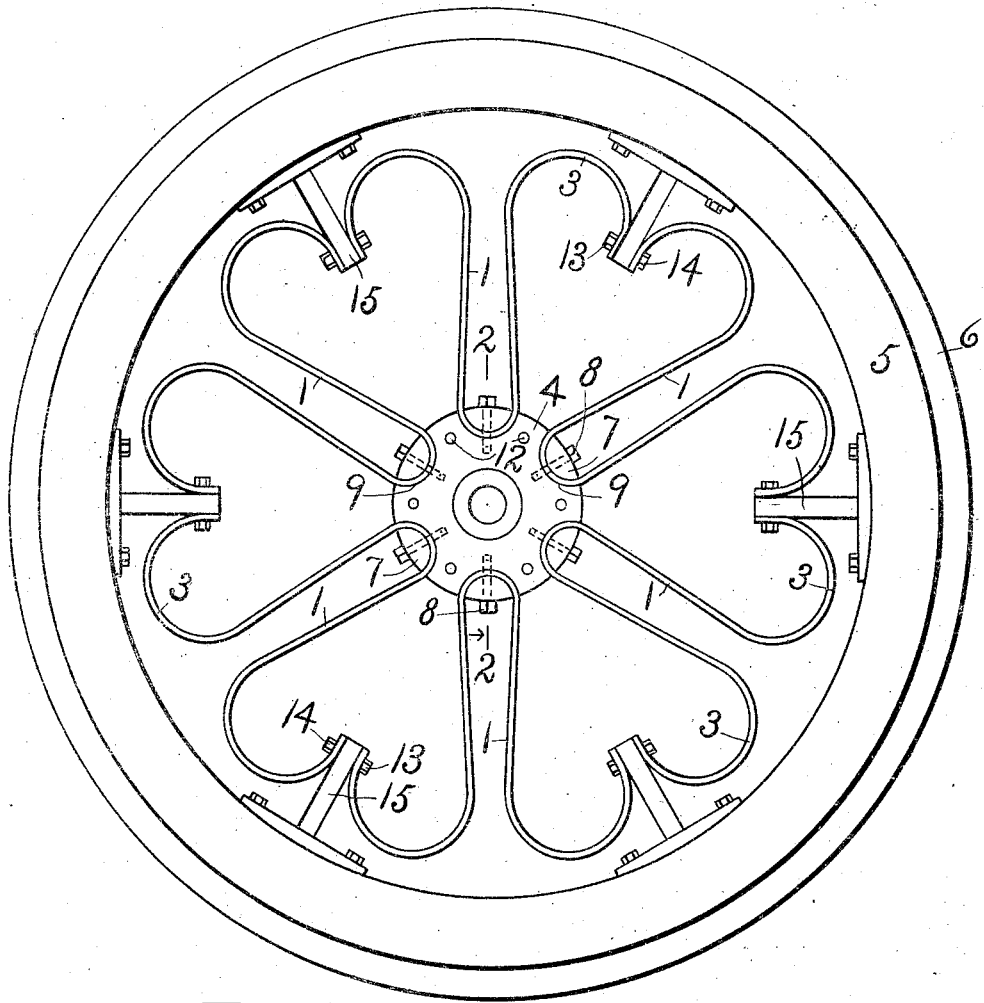
Figure 2:
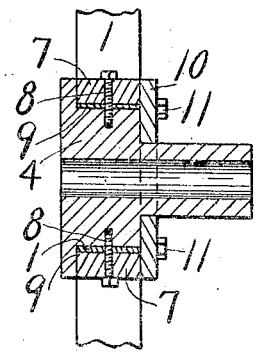

Figure 1 is a side elevation of a wheel which embodies a practical form of my invention, the face-plate being omitted from the hub; Fig. 2, a sectional view of the hub taken on lines 2—2, looking in the direction of the arrow, in Fig. 1; Fig. 3, a side elevation of one-half of a complete wheel similar to that shown in the first view excepting that the rim-attaching means for the springs differ; Figs. 4 and 5, each a fragmentary view illustrating a slightly different method of attaching the spring to the rim from but on general principles similar to that shown in Fig. 3; Figs. 6 and 7, each a fragmentary view disclosing a modified form of spring, and, Fig. 8, a sectional view, similar to Fig. 2, showing the application of check-nuts to the binding-block bolts.

Similar figures refer to similar parts, throughout the several views.

A spring having the general form or shape of a heart has been found to be the best substitute for spokes in spring wheels, hence I adhere to this form or shape in the present case, but procure it by employing and combining for each "heart" adjacent arms or branches of two independent springs of peculiar construction. The apexes of these hearts are formed by the portions of the periphery of the hub that are between the points where the springs are attached to said hub, and the opposite or indented ends of the hearts are formed by the members to which the ends of the springs are attached and by such ends themselves. The springs are represented at 1 in the drawings, and each consists of two radial members joined or connected at their inner ends and rolling outwardly or away from each other at their free terminals to form lobes 3—3. The radial members of the springs 1 need not and usually will not be true radii of the wheel into the construction of which said springs enter. The lobes 3 may be tangent to the radial members of the springs, as in Figs. 1, 3, 4 and 5, or they may be united with said members in a more complex manner, as in Fig. 6 where the center of each lobe is in line with the member with which said lobe is connected, or in Fig. 7 where the end of each lobe is tangent to the member with which said lobe is connected if said member were continued to meet the lobe. What may be termed the heel of each spring 1, that is, the connecting part between the two radial members of said spring, is preferably curved so as to avoid too abrupt bends in the spring, although this particular shape is not imperative. Other changes in the shape of the springs may be made, provided there be no departure from the principal or general configuration. In a wheel, the springs 1 are attached directly to a hub 4 and indirectly to a felly or rim 5. A tire of solid rubber or other suitable material is represented at 6 on the rim 5, in Figs. 1 and 3.

As a means for securely attaching the inner U-shaped or heel portions of the springs 1 to the hub 4 I prefer to employ a plurality of binding-blocks 7 and of bolts 8, said heel portions or heels and said blocks being received into recesses 9 formed at regular intervals in the periphery of said hub, and said bolts passing through the peripheries of said blocks and through said heels into threaded engagement with the body of the hub. The recesses 9, which are of suitable size, shape and depth to properly accommodate the spring heels and the binding-blocks 7, open through the outer face and the periphery of the hub 4, and said outer face or side openings are closed by means of an annular face-plate 10 fastened to said hub on the outside by means of bolts 11, holes 12 for such bolts being tapped into the hub, as shown in the first view. The face-plate 10 affords additional security for the springs at the hub. It will be observed that the spring heels fit into the recesses 9, and that the binding-blocks 7 also fit into said recesses and the heels as well, so that the latter are clamped between the edges of the recesses or the body of the hub and the inner edges of the blocks, when the bolts 11 are set up tight.

The above described means of attachment for the springs 1 to the hub 4 is capable of fulfilling every requirement, as will be readily understood.

The lobes 3 of the springs 1 may be fastened by means of bolts 13 and nuts 14 to the inner ends of simple radial rods 15 which extend inwardly from the rim 5, just as is done in the aforesaid patented wheel, and as I show here in Figs. 1, 6 and 7, but I consider the devices shown in Figs. 3, 4 and 5 as being used in place of said rods to be superior to the rods in matters of strength and durability. The devices just mentioned consist of shoes or stirrup-pieces 16 which are bolted or otherwise securely fastened to the rim 5 and extend inwardly from said rim between the free terminals of the springs 1, which terminals are secured to the inwardly-extending portions of said stirrup-pieces by bolts 13 and nuts 14 or other suitable means. These shoes or stirrup-pieces present concave surfaces for the lobes 3, at and adjacent to their free ends, and so furnish supports for the springs 1 at points where said springs might be liable to break under sudden or undue stress, strain or shock, without detracting from or lessening the efficiency of the springs. The stirrup-pieces 16, in Fig. 3, are flat strips or straps of metal in cross-section, bolted intermediate of their terminals to the inside of the rim 5. The terminals of these stirrup-pieces curve inwardly and come together between the free ends of the springs 1 which are secured thereto. These stirrup-pieces and those in the next view may in some cases and under some circumstances add a little to the "liveliness" of the wheels in which they are incorporated. The stirrup-pieces 16, in Fig. 4, differ from those in the preceding view only in that there are double the number in the Fig. 4 construction, it being as though a section were cut out of the middle of each stirrup-piece in the Fig. 3 construction immediately adjacent to the space between the lobes 3 of the attached spring 1. To state it differently, there is one stirrup-piece for each spring in Fig. 3, and two stirrup-pieces for each spring in Fig. 4. As clearly represented in Fig. 5, the stirrup-pieces may be made solid, there usually being as many of these stirrup-pieces as there are springs, although they are arranged differently from corresponding members in Fig. 3, since each stirrup-piece according to the Fig. 5 construction and arrangement is located adjacent and contiguous to the intimately associated lobes 3 of two neighboring springs. The solid stirrup-pieces afford practically the same kind of anchorage for the free terminals of the springs 1 that do the strap stirrup-pieces, and furnish similar rollways or bearing surfaces for the lobes 3.

The use of the stirrup-piece structures is not limited to the springs shown in Figs. 3, 4, and 5.

The special advantages of the shoes or stirrup-pieces 16 over the rods 15 are clearly apparent from the explanation herein given taken in connection with the illustrations in which said shoes or stirrup-pieces are presented.

The wheel should be constructed in such a way that the springs 1 do not touch each other or the rim 5, even when said springs are under maximum compression.

If additional security for the heels of the springs 1 be desired, the hub 4 may be recessed in the face-plate side inside of the recesses 9, as shown at 17 in the last view, and check-nuts 18 employed on the inner ends of the bolts 8 in said recesses, said bolts screwing into the hub as before and said nuts being tightened on the bolts against the hub. The face-plate 10, when in place, covers the open ends of the recesses 17.

In order to remove a spring 1 from the wheel for any reason all that it is necessary to do is to unscrew the particular bolt 8 that confines the heel of said spring with the aid of one of the binding-blocks 7, after loosening the check-nut 18 on said bolt, provided there be a nut thereon, and take off the nuts 14 and slip out the bolts 13 which fasten the lobes 3 of said spring to two of the rods 15 or to the associated stirrup-pieces 16, as the case may be. Generally, too, it will be necessary to unfasten the face-plate 10, since the parts should be so proportioned that said plate when forced against the hub 4 by the bolts 11 bears so hard on the binding-blocks 7, and possibly on the outer edges of the heels of the springs as well, that none of these last-mentioned members could be removed easily if at all without loosening said bolts. The replacing of the same or another spring is as readily accomplished.

That this wheel is susceptible of numerous changes and modifications, in addition to those already pointed out with greater or less explicitness, which do not depart from the nature of my invention, is obvious, hence it is my intent to include within the scope of my claims all changes and modifications to which I am justly entitled.

What I claim as my invention, and desire to secure by Letters Patent, is—

1. A spring wheel comprising a hub, a rim, a plurality of springs each consisting of connected substantially radial members which at their outer terminals first approach each other and then are directed outwardly or away from each other and turn inwardly toward said hub in the form of lobes, means to attach said springs to said hub, and means to attach the free ends of said lobes to said rim.

2. A spring wheel comprising a hub, a rim, a plurality of springs entirely out of contact one with another, and each consisting of substantially radial members connected to form a heel and which at their outer terminals first approach each other and then are directed outwardly or away from each other and turn inwardly toward said hub in the form of lobes, means to attach said heels to said hub, and means to attach the free ends of said lobes to said rim without the former touching normally the latter.

3. The combination, in a spring wheel, of a hub, a rim, concave shoes or stirrup-pieces fastened to said rim and having portions which project inward toward said hub, a plurality of springs having arcuate terminals to bear on said stirrup-pieces and to conform to a greater or less extent to the bearing surfaces of the same according to the amount of compression of said springs, means to attach the arcuate portions of said springs to said stirrup-pieces, and means to attach the hub portions of said springs to said hub.

4. The combination, in a spring wheel, of a hub, a rim, concave shoes or stirrup-pieces secured on the inside of said rim and having fastening portions which extend inward toward said hub, a plurality of springs the outer terminals of which are in the form of lobes adapted to having their free ends attached to said fastening portions of said stirrup pieces, means to attach said free end of the lobes to the fastening portions of the stirrup-pieces, and means to attach the hub portions of the springs to said hub, the construction and arrangement being such that more or less of each lobe is in contact with a stirrup-piece according to the amount of compression of said springs, the contacting area varying with the amount of compression.

5. The combination, in a spring-wheel, of a recessed hub, a rim, concave shoes or stirrup-pieces secured to said rim and having portions which extend inward toward said hub, a plurality of springs entirely out of contact with each other and each consisting of radial members connected to form a heel and directed outwardly or away from each other at their free terminals to form lobes, the free ends of which latter are directed inward toward said hub, binding-blocks adapted to fit the recesses in said hub outside of the heels of said springs, bolts to secure said blocks and springs to said hub, said bolts passing through the blocks and springs into the hub, and means to secure the inwardly-directed end portions of the lobes of the springs to the inwardly extending portions of said stirrup pieces, the construction and arrangement being such that more or less of each lobe is in contact with a stirrup-piece according to the amount of compression of said springs, the contacting area varying with the amount of compression.

JOHN E. STANNARD.

Witnesses:
F. A. CUTTER,
ALLEN WEBSTER.